No. 806,633. PATENTED DEC. 5, 1905.
L. O. BURNHAM.
TILE MAKING MACHINE.
APPLICATION FILED MAR. 11, 1905.
2 SHEETS—SHEET 1.
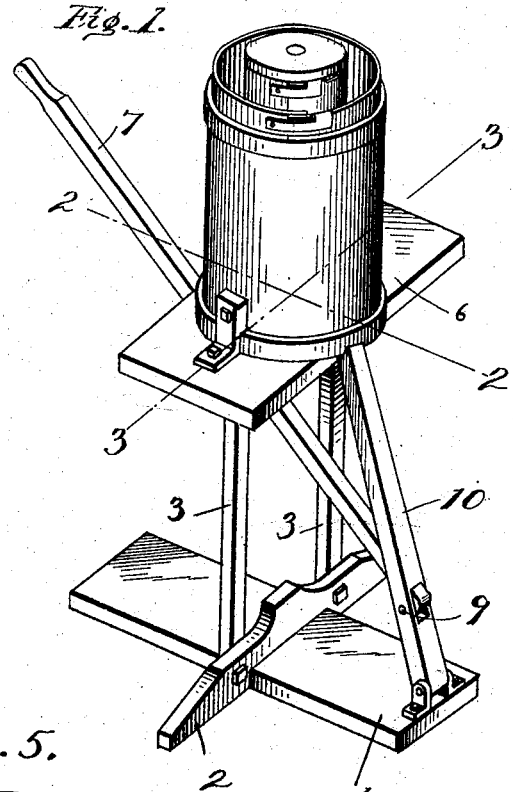
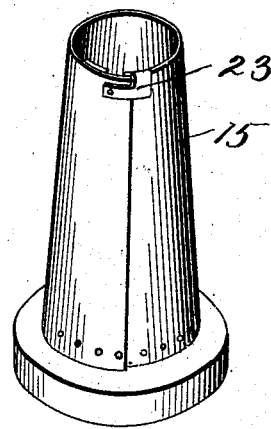
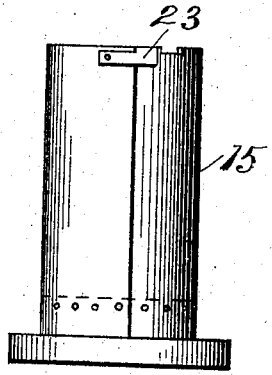
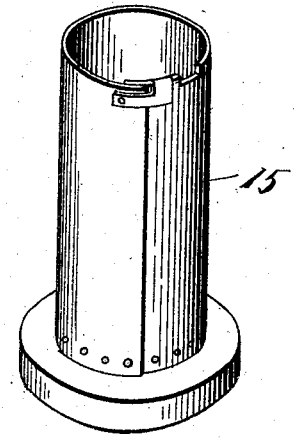
Witnesses
W. P. Taylor
S. W. Fitzgerald
Inventor
L. O. Burnham.
By W. T. Fitzgerald
Attorneys No. 806,633. PATENTED DEC. 5, 1905.
L. O. BURNHAM.
TILE MAKING MACHINE.
APPLICATION FILED MAR. 11, 1905.
2 SHEETS—SHEET 2.
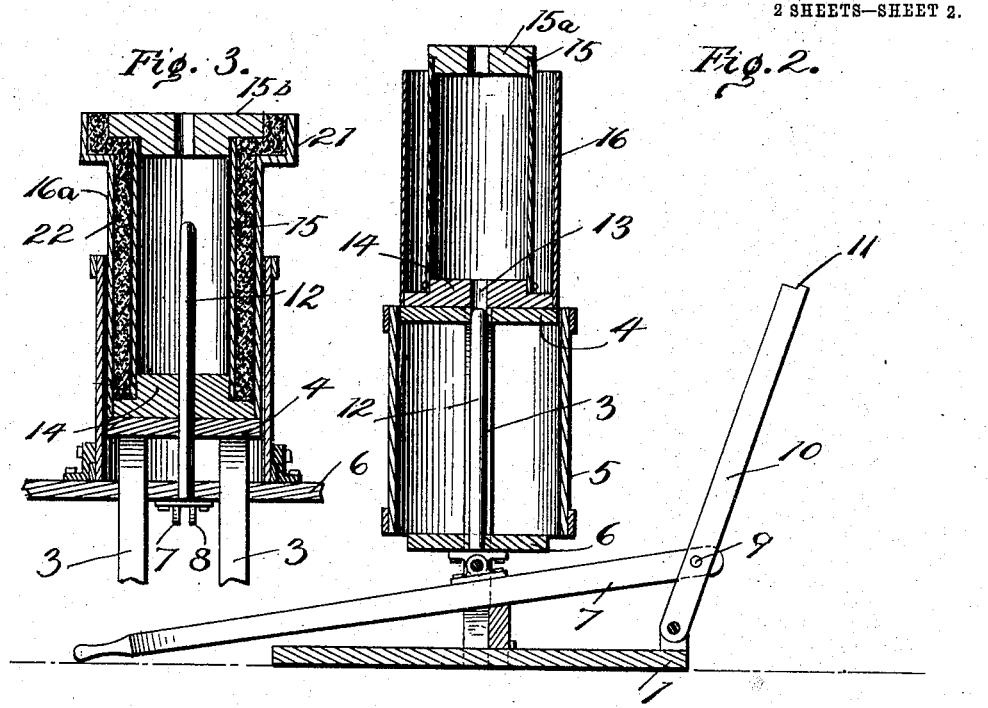
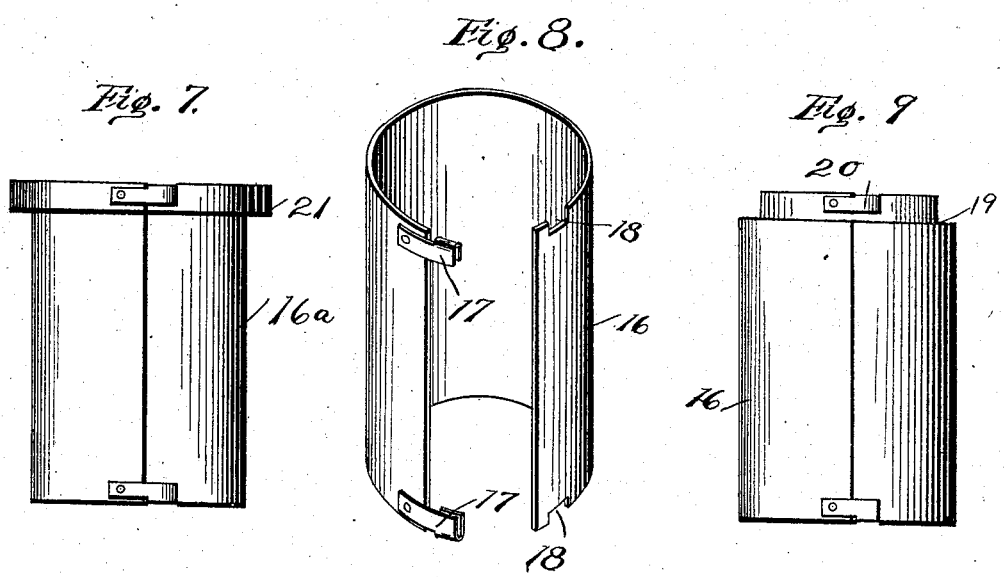
Witnesses
W. P. Taylor
S. V. Fitzgerald
Inventor
L. O. Burnham
By W. T. Fitzgerald & Co.
Attorneys

UNITED STATES PATENT OFFICE.

LORON O. BURNHAM, OF CLARE, MICHIGAN.

TILE-MAKING MACHINE.

No. 806,633.  Specification of Letters Patent.  Patented Dec. 5, 1905.

Application filed March 11, 1905. Serial No. 249,616.

*To all whom it may concern:*

Be it known that I, LORON O. BURNHAM, a citizen of the United States, residing at Clare, in the county of Clare and State of Michigan, have invented certain new and useful Improvements in Tile-Making Machines; and I do hereby declare the following to be a full, clear, and exact description of the invention, such as will enable others skilled in the art to which it appertains to make and use the same.

My present invention relates to a machine for molding drain-tile and the like; and the details of my invention will be hereinafter clearly set forth, it being understood that the preferred form thereof only is presented in this application and that I wish to comprehend all substantial equivalents and substitutes fairly falling within the purview of my invention.

My object, among others, is to fashion from cement or other material a section of a tube adapted as a drain-tile for use in culverts and many other purposes.

In the accompanying drawings, made a part of this application, Figure 1 shows my invention complete ready for use. Fig. 2 is a longitudinal vertical section of parts of the invention, shown in Fig. 1 as taken on line 2 2 thereof. Fig. 3 is a sectional view of a portion of my machine, shown in Fig. 1 on the dividing-line designated 3 3 in said view. Fig. 4 is a detail view of the inner member designed to form the inner surface of the tubing or section of drain-tile. Fig. 5 shows a slightly-modified construction from that presented in Fig. 4 for the same part. Fig. 6 shows a slightly-modified form of base from that shown for the member illustrated in Fig. 4. Fig. 7 shows the outer casing designed to coöperate with the member shown in Fig. 6. Fig. 8 shows the casing in an opened position and designed to coöperate with the base shown in Figs. 4 and 5. Fig. 9 shows a slightly-modified form of construction for the member 8, inasmuch as the upper end thereof is shaped so as to provide the upper end of the tile produced with a reduced terminal adapted to enter the flared or specially-shaped end of another section of tile with which it is designed to coöperate.

Briefly stated, my invention comprehends a suitable form of mold and convenient means for handling or controlling the molds whereby after the tile has been formed from plastic material it may be bodily lifted away without injury and left to harden or dry, as the case may be, without liability to "checking" or cracking, as is common when articles formed from plastic material are left to set or dry without a reinforcing or shaping mold or holder.

Referring in detail to the various parts of my invention, 1 designates the base member of any preferred material and size, and 2 indicates the cross-bar coöperating with the base member and designed to support the standards 3, upon the top of which I secure the table or supporting member proper, 4, which is disk-like in form, as more clearly shown in Fig. 2. Designed to telescope with the standards is the drum or outer casing 5, secured permanently to the carrier 6, which latter is provided with openings to loosely receive the standards 3, whereby the carrier may be readily raised and lowered by the controlling-lever 7, pivotally connected to the lower side of the carrier, as between the ears 8 or equivalent means, the outer end of the lever being pivotally connected, as designated by the numeral 9, to the pivoted standard 10.

The lower end of the standard 10, it will be observed, has a pivotal connection with the end of the base member or platform 1, while the upper end is provided with a recess 11 to fit beneath the edge of the casing 5 or carrier 6, so that when the casing is raised to its fullest extent the end of the member 10 will be moved inward in engagement with the lower edge of the casing, and said member 10 will thus reliably support the casing in an elevated position, as will be clearly obvious by reference to Fig. 1. It will furthermore be observed that I have secured to the carrier 6 the upwardly-projecting shaft or guiding member 12, which fits loosely in a suitable aperture in the table or disk member 4 and also enters loosely through an opening 13 in the bottom 14 of the inner mold 15, as clearly set forth in Fig. 2.

The mold proper consists of the inner casing or member 15 and the exterior casing or jacket 16, and both of said members 15 and 16 are carried by the bottom section 14, above referred to, the member 15 or inner member preferably being permanently secured to the bottom and having a removable apertured cap 15$^a$, while the member 16 is removably connected thereto.

The bottom section 14 is designed normally to rest upon the table or support 4, and the aperture in the center thereof is placed in registration with the aperture in the central portion of said table. It therefore follows that when the bottom 14 and molds carried thereby are placed upon the table the guiding-shaft 12 will enter freely upward through the said openings and into the apertures in cap 15$^a$ and will hold the bottom and the cap in proper position.

The outer casing or member 5 is designed merely as a housing to better secure the molds in position and prevent them from casually slipping off of the table, and thereby lend greater rigidity and strength to the entire appliance.

Obviously any preferred shape may be imparted to the tubing formed by my improved molding process, inasmuch as the tubing-sections may be made square, octagonal, or round in cross-section by properly shaping the molds, as will be obviously clear.

It will be understood that a plurality of molding members 16 shall be provided for each machine, so that when one section of tubing has been formed it may be bodily carried away, together with the molds and the bottom section 14. The section 14 and member 15 are then removed, and the tile is left with member 16 to harden or dry and until such time as the exterior casing may be safely removed therefrom, and it therefore becomes desirable to provide means for quickly removing the exterior molding-casing 16, and I therefore prefer to split the same throughout one side, as shown in Fig. 8, so that the same may be readily expanded and lifted away from the molded member surrounded by it.

Any suitable means may be provided for holding the meeting edges of the member 16 in temporary approximation—as, for instance, the latch 17 or the equivalent thereof, said latches being designed to fit over into the recess 18, provided in a contiguous part of the edge of the casing.

In Fig. 9 I have shown the casing 16 as provided with an inwardly-directed offset or shoulder 19 and with the terminal or flange 20 of reduced diameter. It is by this means that the end of the tiling may be shaped so that the extreme end thereof will be of less diameter than the body portion, and thus fit it to enter the correspondingly-shaped end of a contiguous tile.

In Fig. 3 I have also illustrated the outer member 16$^a$ as slightly modified from the construction illustrated in Fig. 2, inasmuch as an angular shoulder 21 is formed which imparts to the upper end of the tiling (designated by the numeral 22) an enlarged section, insuring that the next contiguous section will fit therein if the end is shaped as shown in the lower part of Fig. 3. With the form shown in this figure a cap 15$^b$ is arranged in the inner member 15 and extends laterally therefrom.

Obviously other shapes may be given to the ends of the tile by properly shaping the molds according to the shape desired.

Having thus fully described the construction of my invention, it is thought that the operation thereof has been made clearly apparent, though it may be stated that when it is desired to use the machine the bottom section 14 is placed upon the table member 4 so that the central aperture in the bottom will register with the opening, through which the shaft 12 is extended when the free end of the lever is raised, which will cause the exterior casing 5 to move upward and surround and support the exterior casing 16 and also cause the supporting member or lever 10 to move inward, so that the recess 11 would engage the lower edge of the casing 5 or the carrier 6, as the case may be, insuring that the casing 5 will be supported until the lever 10 is disengaged. After the casing 5 has thus been elevated, so as to surround the casing 16 and the interior molding member 15, the plastic material is entered so as to fill the annular space between the members 15 and 16, and after said space has been completely filled the member 10 is disengaged and the free end of the lever 7 lowered, which will cause a corresponding movement of the casing 5 and leave the molds 15 and 16 supported upon the table 4, which is carried by the standards 3, as before explained. The molds 15 and 16, with the contents contained therein, may be lifted bodily from the table and removed to a convenient point, after which the member 15 is removed and the tile left to set or harden in the member 16. The members 14 and 15 are then again placed on the table 4, and after putting another member 16 in place therearound the operation just described can be repeated.

In order to show that the inner mold 15 may be easily removed from the newly-formed section or tiling or tubing, I will call attention to Fig. 5, wherein it will be observed that the mold 15 is split longitudinally upon one side and the upper edges thereof are designed to be drawn together and secured in this contracted position by a suitable latch or securing device 23. By then striking the upper end of the inner mold 15 it is withdrawn from contact with the newly-formed section of tiling, thus permitting the inner member to be easily withdrawn therefrom. In like manner the latches or keepers 17 may be disengaged from the recesses 18 and the exterior casing easily taken away.

Having thus fully described my invention, what I claim as new, and desire to secure by Letters Patent, is—

1. The herein-described molding-machine for plastic material whereby the same may be held temporarily until set or partially dry, comprising a suitable supporting-base; standards carried by said base; an exterior housing or casing 5; a controlling-lever operatively connected to said housing; a table mounted on said standards; a centering device 12 carried by the bottom of said housing; an auxiliary lever 10 coöperating with the controlling-lever and suitable collapsible molds adapted to rest upon said table and receive said centering device whereby when the controlling-lever is elevated the housing will be brought to surround said molding appliances and secure them in their operative position, all combined substantially as specified and for the purpose set forth.

2. In a molding-machine the combination with a casing; of a table, collapsible molds adapted to be supported by the table, means for moving the casing into position around the molds and a centering device movable with the casing.

3. In a molding-machine the combination with a stationary table and a collapsible mold supported thereby and having apertures in the ends thereof; of a movable casing adapted to surround the molds and a centering device movable with the casing for entering the apertures in the molds.

4. In a molding-machine the combination with a table; of an inner mold-casing supported upon the table and having an apertured bottom portion, a jacket surrounding the inner mold-casing, means for securing the jacket around the inner casing, a movable casing for surrounding the mold-jacket, a centering device movable with said casing and adapted to extend through the bottom of the mold and means for operating the movable casing.

In testimony whereof I have signed my name to this specification in the presence of two subscribing witnesses.

LORON O. BURNHAM.

Witnesses:
WILLIAM L. PARRISH,
LAWSON WING.